United States Patent [19]

Gill et al.

[11] Patent Number: 4,459,870
[45] Date of Patent: Jul. 17, 1984

[54] REMOTE CONTROL MECHANISMS

[75] Inventors: John G. Gill, Chignal St. James, Nr. Chelmsford; James F. Hemens, Billericay, both of England

[73] Assignee: Teleflex Morse Ltd., Basildon, England

[21] Appl. No.: 202,203

[22] Filed: Oct. 30, 1980

Related U.S. Application Data

[63] Continuation of Ser. No. 909,607, May 25, 1978, abandoned.

[30] Foreign Application Priority Data

Jun. 17, 1977 [GB] United Kingdom ............... 25512/77

[51] Int. Cl.³ ............................ G05G 9/00; F16C 1/10
[52] U.S. Cl. ............................... 74/471 XY; 74/501 R
[58] Field of Search ............. 74/501 R, 501.5 R, 487, 74/473 P, 471 XY, 471 R, 501 M

[56] References Cited

U.S. PATENT DOCUMENTS 3,393,579  7/1968  Wolf ............................ 74/502 UX
3,891,042  6/1975  Braun .......................... 74/471 XY
4,092,744  6/1978  Butoi ........................... 74/471 XY
4,152,950  5/1979  Langford ...................... 74/591 R

*Primary Examiner*—Kenneth Dorner
*Attorney, Agent, or Firm*—James Creighton Wray

[57] ABSTRACT

The invention comprehends a remote control mechanism comprising a control device, a controlled device, and push-pull control links operatively connected at one end to said control device and at the opposite end to said controlled device, said control device being supported for pivotal movement about mutually displaced axes, said controlled device including controlled means supported for linear movement along a longitudinal axis and pivotal movement about said longitudinal axis, said control links being coincidentally moved in response to pivotal movement of said control device about one of said mutually displaced axes to effect pivotal movement of said controlled means about said longitudinal axes, and said central links being differentially relatively moved in response to pivotal movement of said control device about the other of said mutually displaced axes to effect linear movement of said controlled means along said longitudinal axis.

25 Claims, 1 Drawing Figure

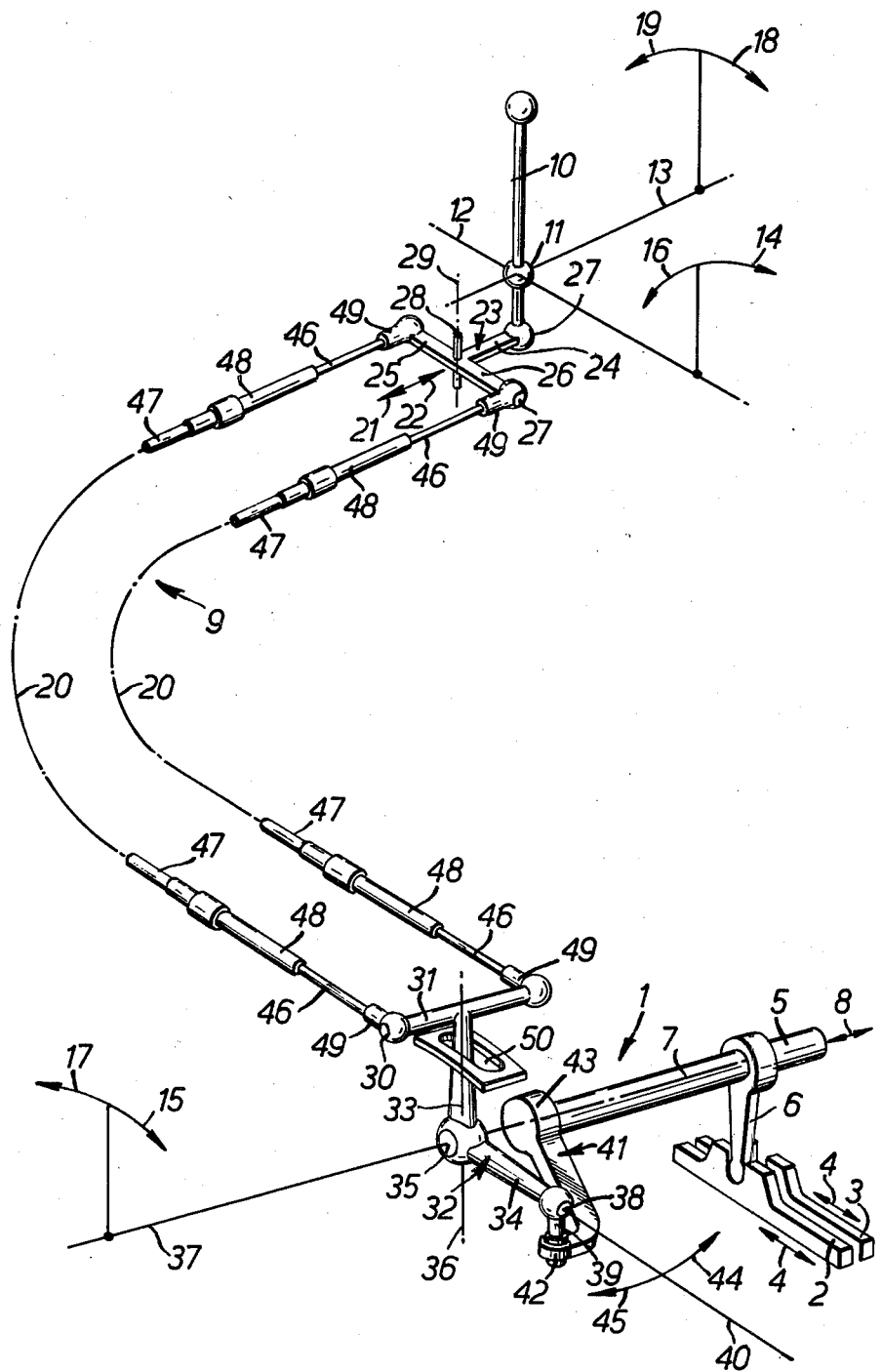

REMOTE CONTROL MECHANISMS

This application is a continuation of application Ser. No. 909,607, filed 5/25/78, now abandoned.

This invention relates to remote control mechanisms.

The invention (whose scope is defined in the appended claims) includes a remote control mechanism comprising push-pull control links operatively connected at one end to spaced locations of a beam, means mounting said beam for equal movement of said spaced locations thereof in the same direction, means mounting said beam for pivotal movement about an axis transverse to the length thereof by which said spaced locations of said beam move in opposite directions, and a member operatively associated with said beam and pivotally movable about two further mutually displaced axes, paired coincident movement of said links being complementary to both said spaced locations of said beam moving equally in said same direction and attendant pivotal movement of said member about one of said mutually displaced axes, and differential relative movement of said links being complementary to pivotal movement of said beam about said transverse axis and attendant pivotal movement of said member about the other of said mutually displaced axes.

The invention also includes a remote control mechanism comprising a control device, a controlled device, and push-pull control links operatively connected at one end to said control device and at the opposite end to said controlled device, said control device being supported for pivotal movement about mutually displaced axes, said controlled device including controlled means supported for linear movement along a longitudinal axis and pivotal movement about said longitudinal axis, said control links being coincidentally moved in response to pivotal movement of said control device about one of said mutually displaced axes to effect pivotal movement of said controlled means about said longitudinal axes, and said control links being differentially relatively moved in response to pivotal movement of said control device about the other of said mutually displaced axes to effect linear movement of said controlled means along said longitudinal axis.

Preferably said control device includes a control beam connected at spaced locations thereof to said one end of said control links, means mounting said control beam for equal movement of said spaced locations thereof in response to pivotal movement of said control device about said one of said mutually displaced axes by which said control beam will coincidentally push or pull said control links in dependence on the direction of said pivot movement of said control device about said one axis, means mounting said control beam for pivotal movement about an axis transverse to the length of said control beam by which said spaced locations of said control beam move in opposite directions in response to pivotal movement of said control device about said other of said mutually displaced axes by which said control beam will push one control link and pull the other control link, and vice versa, in dependence on the direction in which said control device is pivoted about said other axis, and said controlled device includes a controlled beam connected at spaced locations thereof to said other end of said control links, means mounting said controlled beam for equal movement of said spaced locations thereof in response to said push or pull coincidental motion of said control links, means operatively interconnecting said controlled beam with said controlled means to pivot said controlled means about said longitudinal axis in either of opposite directions in dependence on the direction of said equal movement of said spaced beam locations, means mounting said controlled beam for pivotal movement in either of two opposite directions about an axis transverse to the length thereof by which said spaced locations of said controlled beam will move in opposite directions in response to said differential relative movement of said control links, said means operatively interconnecting said controlled beam with said controlled means converting such pivotal motion of said controlled beam into said linear movement of said controlled means along said longitudinal axis and in either of two opposite directions therealong in dependence on the direction of said pivotal movement of said controlled beam.

The control beam may take the form of a Tee bridge piece, and the controlled beam a combined Tee bridge piece and bell crank lever.

The control links are preferably push-pull control cables.

The controlled means, in a preferred embodiment, comprises a gear selector and shift finger.

Whilst the remote control mechanism of the preferred embodiment is employed with a manual change gearbox, it is to be understood that the invention is not necessarily restricted to use in such an environment but finds application in other fields. For the purposes of the present disclosure, however, the description of the remote control mechanism will be confined to the environment of the manual change gearbox.

In order that the invention can be well understood, the preferred embodiment thereof, which is given by way of example, will now be described with reference to the accompanying drawing which is a perspective schematic view of a remote control mechanism used with a manual change gearbox.

A controlled device, for example transmission shifter assembly, generally denoted by reference numeral 1, incorporates a plurality of gear change rails of which, for the present purposes, there are shown two rails 2 and 3. As is conventional, selective translational movement of each of the rails in either of the opposite directions indicated by the respective arrows 4 effects a gear change. For effecting selection and gear shift translation of a rail, there is provided a shaft 5 having fast therewith a lever 6. The shaft 5 is mounted for back and forth translation along its longitudinal axis 7 in the directions of the arrows 8 to bring the lever 6 into operating register with a respective rail. The shaft 5 is also mounted for rotation about its said axis 7 by which to cause the lever 6 to swing and so translate that rail with which the lever at the time is in engagement.

The remote control mechanism, generally referenced 9, is operable to translate the shaft 5, and so select a rail, and rotate the shaft 5, by which to shift the selected rail. Both functions are controlled by movement of a control device which includes control means, for example single operator lever 10.

The operator lever 10 is mounted for pivotal movement, as by means of a ball joint 11, about each of two mutually perpendicular horizontal axes 12 and 13. Pivotal movement of the lever 10 about the axis 12 in the direction of the arrow 14 causes the shifter shaft 5 to rotate in the direction of the arrow 15 so causing the selected rail to shift to the left. When the lever 10 is moved about the same axis 12 but in the direction of the arrow 16, the shifter shaft 5 is rotated in the direction of the arrow 17 so translating the selected rail to the right.

When the lever 10 is pivoted about its other axis of movement, the axis 13, in the direction of the arrow 18, the shifter shaft 5 is translated in the direction of the right hand arrow 8 and so takes the lever 6 out of engagement with the rail 2 and into operable engagement with the rail 3. Movement of the lever 10 in the opposite direction 19 about the axis 13 causes translation of the shifter shaft in the direction of the left hand arrow 8 and hence back into operable engagement with the rail 2.

Such control movement of the lever 10 is imparted to the shifter shaft 5 through a pair of likes which are push-pull cables 20. The operator lever 10 acts on the cables 20 to selectively coincidentally push the cables, coincidentally pull the cables, and differentially relatively move the cables.

The cables 20 are coincidentally pushed, in the direction of the arrow 21, upon movement of the lever 10 in the direction indicated by the arrow 14. The cables 20 are coincidentally pulled, in the direction of the arrow 22, when the lever 10 is moved in the direction of the arrow 16. Finally, the cables 20 are differentially moved, one being pushed and the other pulled, when the lever 10 is moved about the axis 13 in either of the directions indicated by the arrows 18 and 19, there being a changeover in the pushing/pulling force applied to the respective cables as the lever is pivoted from the one, to the opposite direction, about the axis 13. Therefore, coincident (or paired) cable movement performs the shift function, and differential cable movement performs the select function.

As will be seen, therefore, each control movement of the lever 10 is imparted to the shifter shaft 5 through both push-pull cables 20 so that whatever the operating mode the cables share the load. Therefore, at no time is any one cable redundant and since the load is shared between the two cables the life thereof is increased.

The lever 10 is operably connected to the cables 20 through a control beam which is a communication means for example a Tee bridge piece 23 attached at the ends of its respective limbs 24, 25 and 26 by ball joints 27 to the lower end of the lever and to the two cables respectively. The lever 10 is mounted by a pivot pin 28 for pivotal movement about an axis 29. The pivot pin 28 is guided for linear sliding movement in a slot (not shown). Pivotal movement of the lever 10 about its axis 13 in either of the directions 18, 19 causes the bridge piece 23 to pivot about the axis 29 and so effect differential movement of the cables 20. Pivotal movement of the lever 10 about the axis 12 in either of the directions 14, 16 linearly urges the bridge piece 23 in either of the directions 21, 22 with the pin 28 sliding in its guide slot, and so coincidentally pulls or pushes the two cables 20.

The distant ends of the cables 20 are connected by ball joints 30 to each of a controlled device communication, means, for example the opposite ends of the crossbar 31 of controlled means, for example a controlled beam member 32 fashioned as a combined Tee bridge piece and bell crank lever having vertical and horizontal legs 33 and 34 respectively. The member 32 is mounted for pivotal movement, as by a ball joint 35, about two mutually perpendicular axes 36 and 37. The leg 34 is connected by a ball joint 38 to a vertical rod 39 in such a manner that the rod 39 is capable of a limited degree of linear movement relative to the leg 34 along the axis 40. Finally, a kinked lever 41 is fast at one end 42 with the rod 39 and at its opposite end 43 with the shifter shaft 5.

The geometry of this embodiment is such that the axes 7 and 37 are aligned with one another but this is not absolutely necessary. With, though, the axes so aligned, when the cables 20 are coincidentally pushed or pulled, the member 32 is rotated about the axis 37, with its vertical leg 33 guided in a slot 50, in the direction of the arrow 15 or 17 respectively, to effect, through the rod 39 and the lever 41, complementary rotation of the shifter rod 7 and so shift movement of the rail 2 or 3.

When the cables 20 are differentially moved, then the member 32 is caused to turn about the vertical axis 36 and cause the lever leg 34 to swing in either the direction of arrow 44 or 45. Thereby, again through the rod 39 and the lever 41, the shifter rod 7 is appropriately translated, as indicated by the arrowed line 8, to execute a selector movement relative to the rails 2 and 3. It is during this swing of the leg 34 that the rod 39 will linearly move in relation to the leg 34 as is provided for in the connection therebetween.

The member 32 may be considered to be one part of a controlled device which, in response to coincident (or paired) cable movement, is rotated about one—horizontal—axis, and which, in response to differential cable movement, is rotated about a second—vertical—axis.

Whilst in this embodiment, the push pull cables 20 are flexible cables, they could take the form of solid rods. As flexible cables, each comprises a flexible core 46 slidably mounted in a guide conduit 47 terminated by a fixed guide tube 48. Each flexible core 46 is fast at its opposite ends with terminal members 49 connected by the ball joints 27 and 30 to the bridge piece 23 and member 32 respectively.

In an alternative embodiment, a single conduit having two coaxial cores is utilised instead of the described pair of coaxial cables 20. Yet again, a single coaxial cable could be utilised in which both the core and the casing are slidable, each performing the function of one of the cables 20.

Although in the described embodiment, universal bearings in the form of ball joints have been described, other forms of such bearings may be adopted as is convenient.

We claim:

1. A remote control mechanism comprising push-pull control links operatively connected at one end to spaced locations of a beam, means mounting said beam for equal movement of said spaced locations thereof in the same direction, means mounting said beam for pivotal movement about an axis transverse to the length thereof by which said spaced locations of said beam move in opposite directions, and a member operatively associated with said beam and pivotally movable about two further mutually displaced axes, means connected to the member for effecting paired coincident movement of said links and equal movement of both said spaced locations of said beam in said same direction upon attendant pivotal movement of said member about one of said mutually displaced axes, and for effecting opposite movement of said links and pivotal movement of said beam about said transverse axis upon attendant pivotal movement of said member about the other of said mutually displaced axes.

2. A remote control mechanism as claimed in claim 1, wherein said member is a control member operable upon being pivoted in one direction about said one of said mutually displaced axes to effect via said beam coincidental pulling of said links, operable upon being pivoted in the opposite direction about said one axis to effect via said beam coincidental pushing of said links, operable upon being pivoted on one direction about said other of said mutually displaced axes to effect via said beam pushing of one of said links and pulling of the other of said links, and operable upon being pivoted in the opposite direction about said other axis to effect via said beam pulling of said one link and pushing of said other link.

3. A remote control mechanism as claimed in claim 1 or claim 2, wherein said transverse axis is spaced centrally of said spaced locations of said beam by which said spaced locations will move equally but in opposite directions upon pivotal movement of said beam about said transverse axis.

4. A remote control mechanism as claimed in claim 1, wherein said mutually displaced axes are perpendicular to one another.

5. A remote control mechanism as claimed in claim 4, wherein said pivotal axis of said beam is a vertical axis, said other of said mutually displaced axes is a horizontal axis, and said one of said mutually displaced axes is a horizontal axis.

6. A remote control mechanism as claimed in claim 1, wherein said means mounting said beam for equal movement of said spaced locations thereof in the same direction mounts said beam for linear sliding movement in either of two opposite directions.

7. A remote control mechanism as claimed in claim 1, wherein a universal joint provides for pivotal movement of said member about said two mutually displaced axes.

8. A remote control mechanism as claimed in claim 7, wherein said beam is operatively connected to one end of said member having said univeral joint intermediate its ends.

9. A remote control mechanism as claimed in claim 8, wherein said universal joint is a ball joint.

10. A remote control mechanism as claimed in claim 1, including a controlled device having a beam connected at spaced locations thereof to the opposite end of said control links, means mounting said controlled device beam for pivotal movement about one of two mutually displaced axes by which said spaced locations of said controlled beam move equally in the same direction, and means mounting said controlled beam for pivotal movement about the other of its two mutually displaced axes by which said spaced locations of said controlled beam move in opposite directions, said paired coincidental movement of said links causing pivotal movement of said controlled beam about said one of its two mutually displaced axes, and said differential relative movement of said links causing pivotal movement of said controlled beam about said other of its two mutually displaced axes.

11. A remote control mechanism as claimed in claim 10, wherein said controlled beam is operatively associated with a controlled member supported for linear movement along a longitudinal axis and supported for pivotal movement about said longitudinal axis, pivotal movement of said controlled beam about said one of its two mutually displaced axes causing pivotal movement of said controlled member about said longitudinal axis, and pivotal movement of said controlled beam about said other of its two mutually displaced axes causing linear movement of said controlled member along said longitudinal axis.

12. A remote control mechanism as claimed in claim 11, including means operable both to transmit pivotal movement of said controlled beam about said one of its two mutually displaced axes to said controlled member to pivot said controlled member about said longitudinal axes and to convert pivotal movement of said controlled beam about said other of its two mutually displaced axes into linear movement of said controlled member along said longitudinal axes.

13. A remote control mechanism as claimed in claim 12, wherein said one of said mutually displaced axes of said controlled beam is a horizontal axes, said other of said mutually displaced axes of said controlled beam is a vertical axis and said longitudinal axis is a horizontal axis.

14. A remote control mechanism as claimed in claim 13, wherein said controlled beam horizontal axis and said longitudinal axis constitute one and the same axis.

15. A remote control mechanism as claimed in claim 11, wherein said controlled member is a gear selector and shift finger.

16. A remote control mechanism as claimed in any of claims 10 to 15, wherein said means mounting said controlled beam for pivotal movement about said one and said other of its said mutually displaced axes includes a universal joint.

17. A remote control mechanism as claimed in claim 16, wherein said universal joint providing for said pivotal movement of said controlled beam is a ball joint.

18. A remote control mechanism as claimed in claim 1, wherein said control links comprise push-pull cables.

19. A remote control mechanism of claim 1 the means for effecting movement further comprising a rod connected to the member for translation along a rod axis upon spaced locations of the beam moving equally in the same direction and pivotal movement of the member about said one of said mutually displaced axes and for rotation about the transverse axis upon pivotal movement of the member about said other of said mutually displaced axis.

20. The remote control mechanism of claim 19 wherein the rod axis is aligned with the said one of said mutually displaced axes.

21. A remote control mechanism comprising a control device, a controlled device, and push-pull control links operatively connected at one end to said control device and at the opposite end to said controlled device, said control device including control means supported for pivotal movement about mutually displaced axes, said controlled device including controlled means supported for linear movement along a longitudinal axis and pivotal movement about said longitudinal axis, said control device further including means connected to the control links and control means for communicating motion from said control means to said control links to coincidentally move said control links in response to pivotal movement of said control device about one of said mutually displaced axes and to differentially relatively move said control links in response to pivotal movement of said control device about the other of said mutually displaced axes, said controlled device further including means connected to the control links and the controlled means for communicating motion from the control links to the controlled means to pivot said controlled means about said longitudinal axis upon said coincidental movement of the control links and to linearly move said controlled means along said longitudinal axis upon said differential movement of the control links.

22. A remote control mechanism as claimed in claim 19 wherein said control device communications means includes a control beam connected at spaced locations thereof to said one end of said control links, means mounting said control beam for equal movement of said spaced locations thereof in response to pivotal movement of said control means about said one of said mutually displaced axes by which said control beam will coincidentally push or pull said control links in dependence on the direction of said pivotal movement of said control means about said one axis, means mounting said control beam for pivotal movement about an axis transverse to the length of said control beam by which said spaced locations of said control beam move in opposite directions in response to pivotal movement of said control means about said other of said mutually displaced axes by which said control beam will push one control link and pull the other control link, and vice versa, in dependence on the direction in which said control means is pivoted about said other axis, and wherein said controlled device communications means includes a controlled beam connected at spaced locations thereof to said other end of said control links, means mounting said controlled beam for equal movement of said spaced locations thereof in response to said push or pull coincidental motion of said control links, means operatively interconnecting said controlled beam with said controlled means to pivot said controlled means about said longitudinal axis in either of opposite directions in dependence on the direction of said equal movement of said spaced beam locations, means mounting said controlled beam for pivotal movement in either of two opposite directions about an axis transverse to the length thereof by which said spaced locations of said controlled beam will move in opposite directions in response to said differential relative movement of said control links, said means operatively interconnnecting said controlled beam with said controlled means converting said pivotal motion of said controlled beam into said linear movement of said controlled means along said longitudinal axis and in either of two opposite directions therealong in dependence on the direction of said pivotal movement of said controlled beam.

23. A remote control mechanism as claimed in claim 19 wherein the controlled device communicating means includes a controlled crank lever pivotable about a controlled lever axis.

24. A remote control mechanism comprising a control device, a controlled device, and push-pull control links operatively connected at one end to said control device and at the opposite end to said controlled device, said control device being supported for pivotal movement about mutually displaced axes, said controlled device including controlled means supported for linear movement along a longitudinal axis and pivotal movement about said longitudinal axis, said control links being coincidentally moved in response to pivotal movement of said control device about one of said mutually displaced axes to effect pivotal movement of said controlled means about said longitudinal axes, and said control links being differentially relatively moved in response to pivotal movement of said control device about the other of said mutually displaced axes to effect linear movement of said controlled means along said longitudinal axis, wherein the controlled means comprises a combined Tee Bridge piece and bell crank lever having vertical and horizontal intersecting legs and a ball joint at an intersection of the legs and having a crossbar centrally connected at a top of the vertical leg and having means for connecting the push-pull control links at opposite ends of the crossbar.

25. A remote control mechanism of claim 21 further comprising a vertical rod connected to an end of the horizontal leg remote from the ball joint.

* * * * *